(12) United States Patent
Robinson et al.

(10) Patent No.: US 9,164,581 B2
(45) Date of Patent: Oct. 20, 2015

(54) AUGMENTED REALITY DISPLAY SYSTEM AND METHOD OF DISPLAY

(75) Inventors: Ian N Robinson, Pebble Beach, CA (US); April Slayden Mitchell, San Jose, CA (US); Daniel G Gelb, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 81 days.

(21) Appl. No.: 13/880,952

(22) PCT Filed: Oct. 22, 2010

(86) PCT No.: PCT/US2010/053860
§ 371 (c)(1),
(2), (4) Date: Apr. 22, 2013

(87) PCT Pub. No.: WO2012/054063
PCT Pub. Date: Apr. 26, 2012

(65) Prior Publication Data
US 2013/0207896 A1    Aug. 15, 2013

(51) Int. Cl.
*G06F 3/033* (2013.01)
*G09G 5/08* (2006.01)
*G06F 3/01* (2006.01)
*G06F 3/0481* (2013.01)

(52) U.S. Cl.
CPC ............ *G06F 3/013* (2013.01); *G06F 3/04815* (2013.01)

(58) Field of Classification Search
None
See application file for complete search history.

(56) References Cited

U.S. PATENT DOCUMENTS

| | | |
|---|---|---|
| 4,997,263 A | 3/1991 | Cohen et al. |
| 5,252,950 A | 10/1993 | Saunders et al. |
| 5,266,930 A | 11/1993 | Ichikawa et al. |
| 6,481,851 B1 | 11/2002 | McNelley et al. |
| 6,710,797 B1 | 3/2004 | McNelley et al. |
| 6,767,099 B2 | 7/2004 | Perkins et al. |
| 6,771,294 B1 | 8/2004 | Pulli et al. |
| 7,177,144 B2 | 2/2007 | Ha et al. |
| 7,385,600 B2 | 6/2008 | Marion |
| 7,567,436 B2 | 7/2009 | Jeong |
| 7,685,524 B2 | 3/2010 | Rekimoto |
| 7,724,511 B2 | 5/2010 | Jacobs |
| 7,983,920 B2 | 7/2011 | Sinclair, II |
| 8,046,719 B2 | 10/2011 | Skourup et al. |
| 2002/0044152 A1 | 4/2002 | Abbott et al. |

(Continued)

FOREIGN PATENT DOCUMENTS

| | | |
|---|---|---|
| CN | 2602454 Y | 2/2004 |
| JP | 7234743 A | 9/1995 |

(Continued)

OTHER PUBLICATIONS

Billinghurst et al ~ "Towards Ambient Augmented Reality With Tangible Interfaces"~ Human Computer Interaction ~ Part III HCII 2009 ~ pp. 387396.

(Continued)

*Primary Examiner* — Nicholas Lee
(74) *Attorney, Agent, or Firm* — HP Legal Department

(57) ABSTRACT

The present invention describes a display system that includes a display, including a display screen; a viewpoint assessment component to determine a viewpoint of a user positioned in front the display screen; and an object tracking component to track the user manipulation of an object positioned behind the display screen.

17 Claims, 12 Drawing Sheets

(56) References Cited

U.S. PATENT DOCUMENTS

| | | |
|---|---|---|
| 2003/0107643 A1 | 6/2003 | Yoon |
| 2003/0142068 A1 | 7/2003 | DeLuca et al. |
| 2003/0151726 A1 | 8/2003 | Perkins et al. |
| 2005/0041009 A1 | 2/2005 | Kuroda |
| 2005/0046953 A1 | 3/2005 | Repetto et al. |
| 2005/0083713 A1 | 4/2005 | Boks |
| 2005/0166163 A1 | 7/2005 | Chang et al. |
| 2006/0017654 A1 | 1/2006 | Romo |
| 2006/0108483 A1 | 5/2006 | Wolff et al. |
| 2007/0164988 A1 | 7/2007 | Ryu et al. |
| 2007/0200547 A1 | 8/2007 | Chen |
| 2007/0236485 A1 | 10/2007 | Trepte |
| 2007/0253600 A1* | 11/2007 | Furukawa et al. ............ 382/112 |
| 2007/0291008 A1 | 12/2007 | Wigdor et al. |
| 2008/0018555 A1 | 1/2008 | Kuo et al. |
| 2008/0024523 A1 | 1/2008 | Tomite et al. |
| 2008/0084395 A1 | 4/2008 | Dawson et al. |
| 2008/0088602 A1 | 4/2008 | Hotelling |
| 2008/0211813 A1 | 9/2008 | Jamwal et al. |
| 2008/0211832 A1 | 9/2008 | Kumon |
| 2008/0218434 A1 | 9/2008 | Kelly et al. |
| 2008/0284729 A1 | 11/2008 | Kurtenbach et al. |
| 2009/0135135 A1 | 5/2009 | Tsurumi |
| 2009/0288889 A1 | 11/2009 | Carlvik et al. |
| 2009/0298548 A1 | 12/2009 | Kim et al. |
| 2010/0007613 A1 | 1/2010 | Costa |
| 2010/0035658 A1 | 2/2010 | Lee |
| 2010/0045569 A1 | 2/2010 | Estevez et al. |
| 2010/0053151 A1 | 3/2010 | Marti et al. |
| 2010/0073404 A1 | 3/2010 | Brown et al. |
| 2010/0087229 A1 | 4/2010 | Maatta |
| 2010/0107099 A1 | 4/2010 | Frazier et al. |
| 2010/0138766 A1 | 6/2010 | Nakajima |
| 2010/0153313 A1 | 6/2010 | Baldwin et al. |
| 2010/0164959 A1 | 7/2010 | Brown et al. |
| 2010/0177035 A1 | 7/2010 | Schowengerdt et al. |
| 2010/0207888 A1 | 8/2010 | Camiel |
| 2010/0253593 A1 | 10/2010 | Seder et al. |
| 2010/0277439 A1 | 11/2010 | Charlier et al. |
| 2010/0287500 A1 | 11/2010 | Whitlow et al. |

FOREIGN PATENT DOCUMENTS

| | | |
|---|---|---|
| KR | 20030058204 A | 7/2003 |
| WO | WO-2010007426 A2 | 1/2010 |

OTHER PUBLICATIONS

D. Wigdor et al., "LucidTouch: A see-Through mobile device," Proceedings of UST'07, Oct. 7-10, 2007; Newport, RI.

http://www.youtube.com/watch?v=V4Yj1Y3Pg20&feature=related > Publication Date: Jul. 12, 2008 ~ video ~ ARTToolKirt ARDeskTop ~ No Copy to Be Sent.

International Search Report and Written Opinion in parent PCT patent application PCT/US2010/053860, dated Jul. 29, 2011.

N R. Hedley et al., "Explorations in the use of augmented reality for geographic visualization," Presence: Teleoperators and Virtual Enviroments-Mixed Reality journal, vol. 11, issue 2, Apr. 2002, pages 119-133.

Nishina et al.; "Photometric Registration by Adaptive High Dynamic Range image Generation for Augmented Reality", IEEE Int'l Symp Mixed & Augmented Reality, Sep. 2008, 4 pgs.

D. Wigdor et al., "LucidTouch: A see-through mobile device," Proceedings of UST'07, Oct. 7-10, 2007, Newport, RI.

N.R. Hedley et al., "Explorations in the use of augmented reality for geographic visualization," Presence: Teleoperators and Virtual nviroments—Mixed Reality journal, vol. 11, issue 2, Apr. 2002, pp. 119-133.

International search report and written opinion in parent PCT patent application PCT/US2010053860, dated Jul. 29, 2011.

* cited by examiner

AUGMENTED REALITY DISPLAY SYSTEM AND METHOD OF DISPLAY

BACKGROUND

Sensing technologies are available which make it possible to manipulate computer generated content via simple gestures in front of a display screen. Also, display technologies are available that allow a user to view the computer generated content in 3 dimensions (3D). Current display systems with gesture based control systems are often problematic in that the user's hands tend to block the user's view of the content being manipulated on the display screen.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

In one embodiment of the present invention, the display screen is comprised of a transparent material so that a user positioned in front of the display screen can easily see through it. Viewpoint assessment sensors are positioned to capture information about a user and his position in front of the display screen. In addition the display system includes object tracking sensors positioned to track a physical object positioned behind the screen and manipulated by the user. The object behind the screen being manipulated by the user can be the user's own hand or a physical object being held or otherwise manipulated by the user. Responsive to data output from the viewpoint assessment sensors and the object tracking sensors, an image is generated on the display screen that overlays or augments objects placed behind the screen. These overlaid images are registered with the objects positioned behind the screen based on the user's viewpoint (eye position). The sensed position of the user's hands relative to the objects can be used to enable manipulation of the overlaid images on the display screen.

Figure 1:
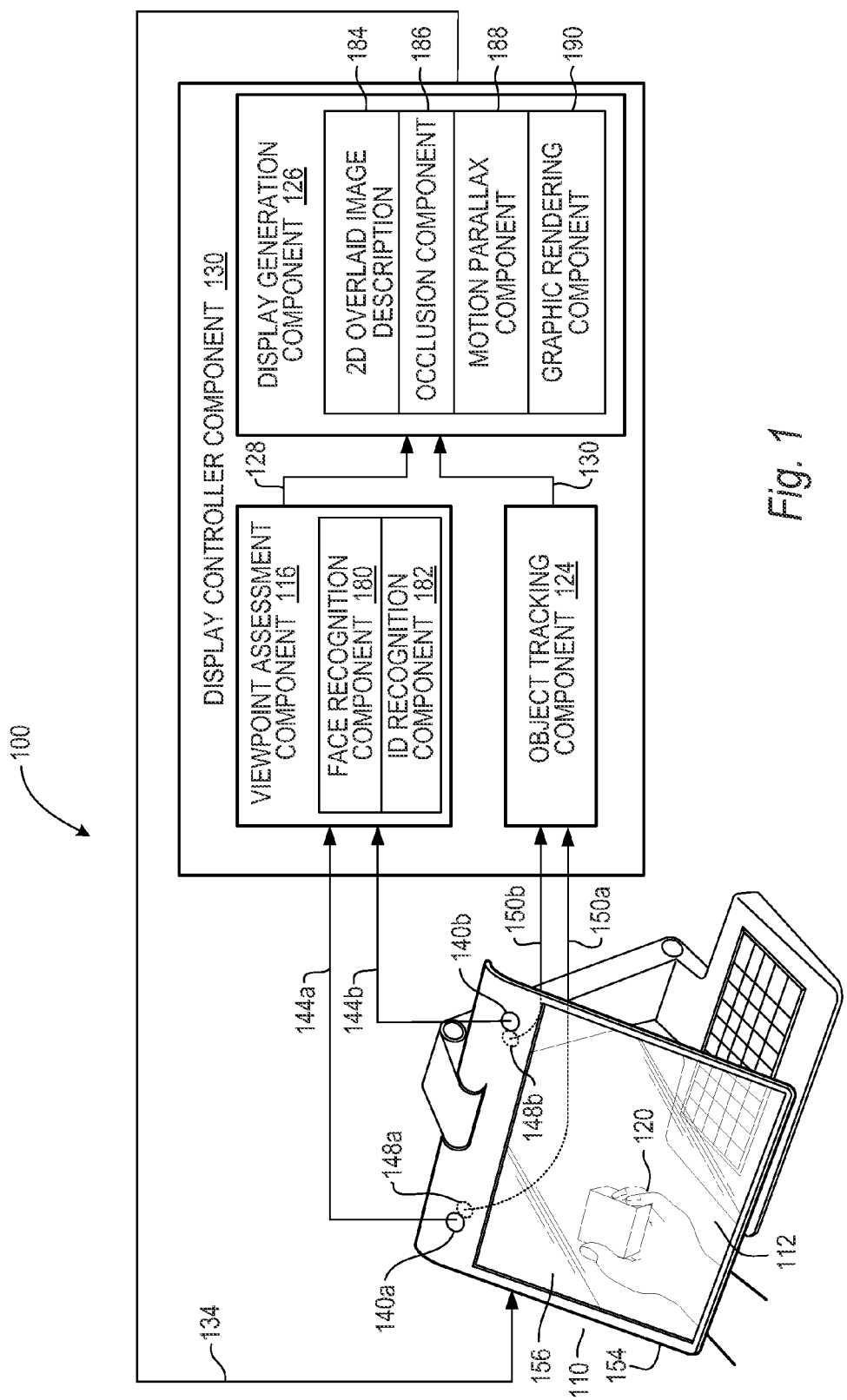
FIG. 1 illustrates a block diagram of a front view of a display screen in an augmented reality display system according to an embodiment of the invention.

Referring to FIG. 1 shows a block diagram of a front view of a display screen in an augmented reality display system according to an embodiment of the invention. The present invention is a display system 100 comprising: a display 100, including a display screen 112; a viewpoint assessment component 116 to determine a viewpoint of a user positioned in front the display screen 112; and an object tracking component 124 capable of tracking the user manipulation of an object 120 positioned behind the display screen 112. In addition, the display system also can include a display generation component 126, wherein based on data 128 from the viewpoint assessment component 116 and data 130 from the object tracking component 124, the display generation component 126 creates content for the display on the display screen 112. The display controller component 130 outputs data 134 from at least the display generation component 126 to the display screen 112.

Figure 2A:
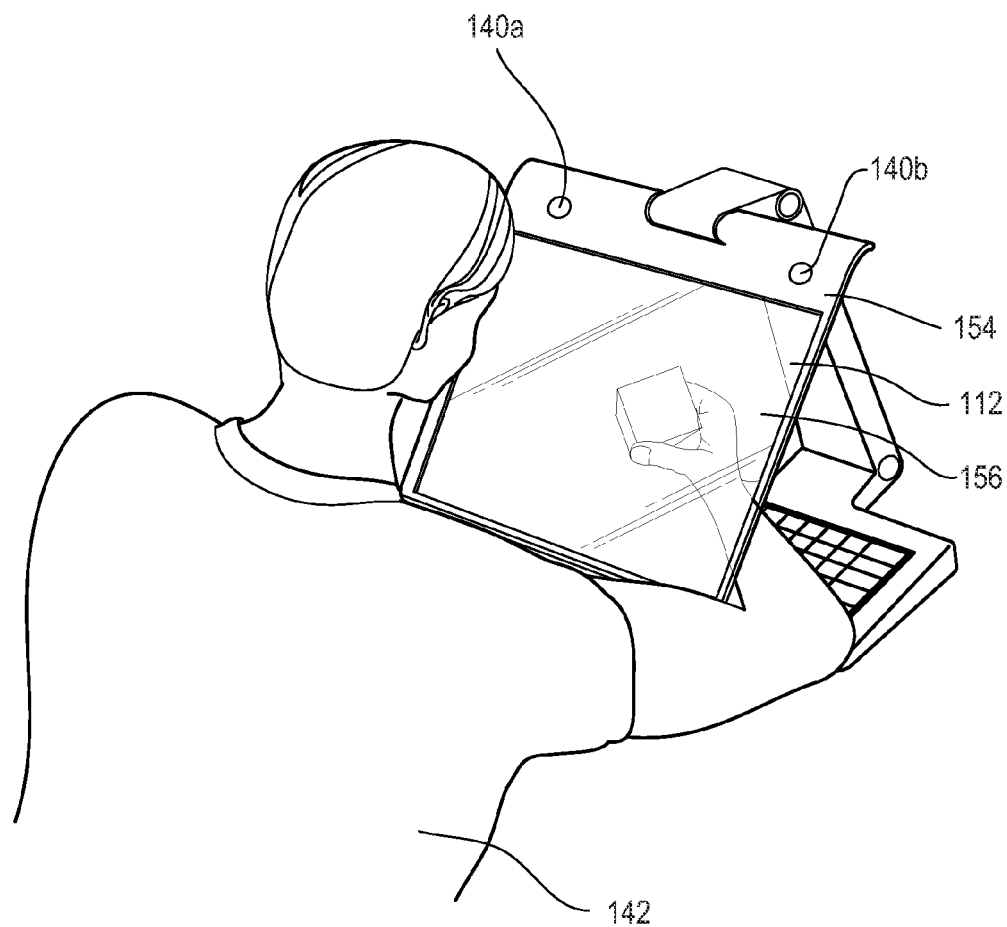
FIG. 2A shows a front perspective view of a desktop version of an augmented reality display system according to an embodiment of the invention.
Figure 2B:
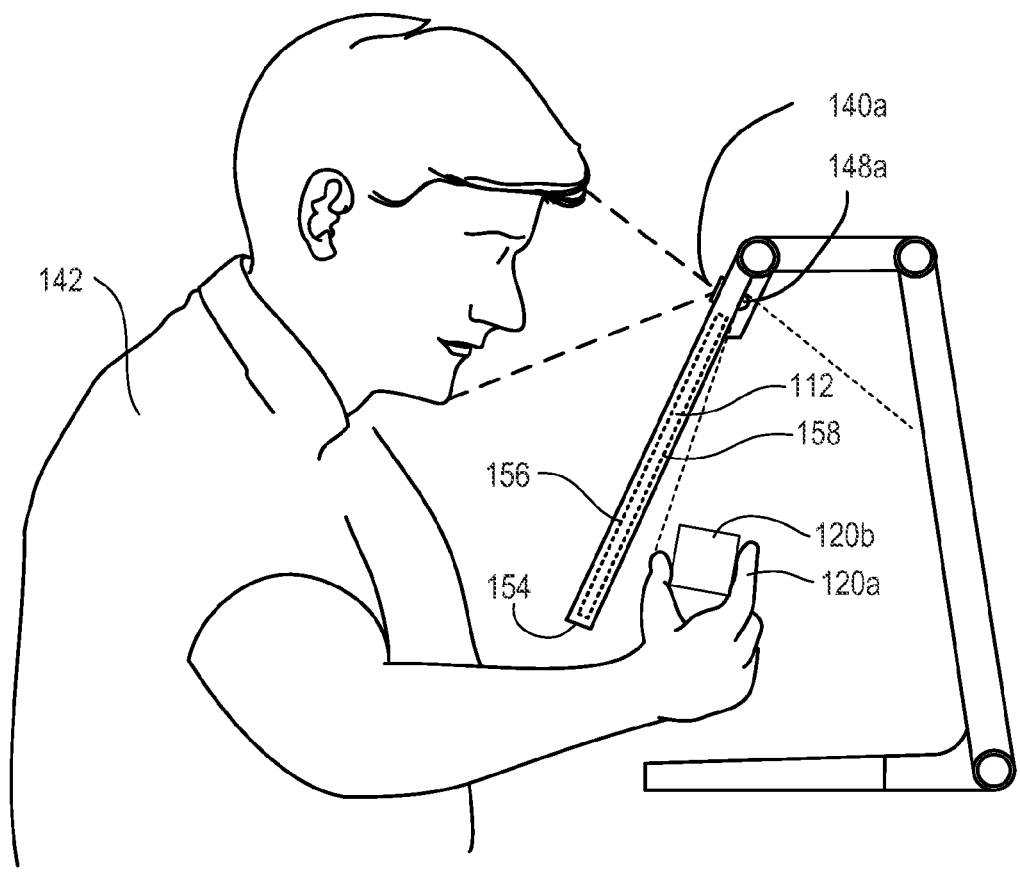
FIG. 2B shows a side view of a desktop version of an augmented reality display system according to an embodiment of the invention.

FIG. 2A shows a front perspective view of a desktop version of an augmented reality display system according to an embodiment of the invention. FIG. 2B shows a side view of a desktop version in FIG. 2A. In the embodiment shown in FIGS. 1-3 and 5-6, the display 110 includes a display screen 112 that is comprised of a transparent screen material. Viewpoint assessment sensors 140a, 140b are positioned to face towards the user to capture the user's head position or facial detail. In the embodiment shown in FIG. 2B, the dotted lines show the capture range of the sensors (both viewpoint assessment and object tracking). The capture range depends upon the type of sensor used and the position of the sensor. Referring to FIG. 1, the viewpoint assessment sensor data 144a, 144b is used by the viewpoint assessment component 116 to determine the user's viewpoint.

Figure 2C:
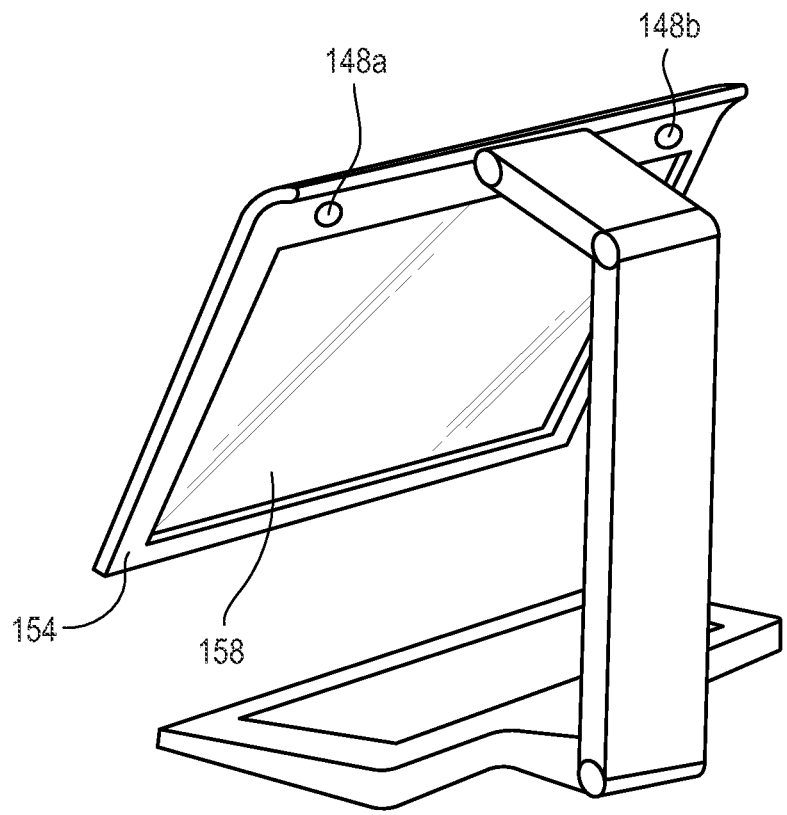
FIG. 2C shows a perspective back view of a desktop version of an augmented reality display system according to an embodiment of the invention.

In addition, the display system 100 includes one or more object tracking sensors 148a, 148b covering the space behind the display screen to sense objects (including the user's hands) positioned behind the display screen. FIG. 2C shows a perspective back view of a desktop version of an augmented reality display system according to an embodiment of the invention where the object tracking sensors 148a, 148b can be more clearly seen.

Referring to FIG. 1, data 150a, 150b collected from the object tracking sensors 148a, 148b can be used by the object tracking component to determine the position (and, optionally, shape and orientation) of an object 120 behind the screen. Data (128, 130) output from the viewpoint assessment component 116 and the object tracking component 124 is used by the display generation component to generate an image on the display screen that can overlay or augment objects behind the screen.

The display system includes a display screen 112 for displaying content. In one embodiment, the display screen is a transparent screen which allows a user interacting with the display to see objects positioned behind the display. In an alternative embodiment, the display screen is opaque but transparency is simulated by displaying a view of objects behind the display screen captured by a video camera that captures video behind the display screen. In another alternative embodiment, the display screen is capable of operating either in a first mode (a transparent screen) and a second mode (an opaque screen), and switching between the two modes based on system or user controlled instructions.

Different screen materials may be used to provide the transparent display screen 112. In one embodiment, the transparent display screen is a transparent OLED (organic light-emitting diode) screen. In an alternative embodiment, the display screen is comprised of transparent LCDs (liquid crystal display). However, the transparent LCD screen implementation assumes a well lit working environment. In a third alternative embodiment, the display screen is comprised of a partially diffusing material and the content is projected onto the partially diffusing material. Although many alternative implementations are possible, the transparent display screen operates so that objects positioned behind the display screen can be easily seen or viewed by a user positioned in front of the display screen. The transparent display allows the user to have a clear view of the objects behind the screen that are being manipulated in real time and to instantaneously see the effect of their manipulation on the object.

As previously described, in one embodiment the display screen is capable of switching between display modes. For example, the display screen would be transparent in one mode and in a second, opaque, mode the display screen would operate as a conventional display screen. A display screen capable of switching between two modes could be implemented in one embodiment as a transparent OLED screen with a liquid crystal shutter positioned behind the OLED screen. In a first mode the transparent LED screen would be transparent (liquid crystal shutter open) and in a second mode the screen would appear to be opaque (liquid crystal shutter behind the display screen closed) for use as a conventional display.

In one embodiment, the display screen 112 includes a frame 154 or bezel, typically located around the periphery of the display screen. Referring to FIG. 1, the display has both a front surface 156 and a back surface 158 (shown more clearly for example in FIGS. 2 and FIG. 3). For the embodiment in FIG. 1, sensors that collect data for the viewpoint assessment component, viewpoint assessment sensors 140a, 140b, are positioned so that they are capable of determining the viewpoint of a user positioned in front of the display screen. Referring to FIG. 2B shows dotted lines emanating from the viewpoint assessment sensor 140a, the dotted lines indicating the approximate capture range of the viewpoint assessment sensors. In the example shown in FIG. 2B, the image viewpoint assessment sensors are image capture devices intended to capture the facial detail of the user 142.

Because in the embodiment described with respect to FIG. 1, the display screen is transparent, it is possible for the viewpoint assessment sensors to be located in a position behind the display screen as long as this sensor position provides a clear viewing angle of the user. However, in the example shown in FIG. 1, the viewpoint assessment sensors 140a, 140b are positioned on the front side of the display screen so that content on the display screen, and its surrounding bezel, does not interfere with the sensed information.

Referring to FIG. 1 the perimeter of the object tracking sensors 148a, 148b on the back of the display are represented by dotted lines. Sensors that collect data for the object tracking component, object tracking sensors 148a, 148b, are positioned so that they are capable of capturing data about the objects (including the user's hand) positioned behind the display screen. Referring to FIG. 2B shows dotted lines emanating from the object tracking sensor 148a, the dotted lines indicating the approximate capture range of the object tracking sensor. As previously described with respect to the viewpoint assessment sensors, because the display screen can be transparent, it is possible for the object tracking sensors to be located in a position in front of the display screen. However, typically the object tracking sensors are positioned on the back side of the display screen so that content on the display screen, and its surrounding bezel, does not interfere with the sensed information.

Although multiple viewpoint assessment and object tracking sensors are shown around the boundary of the display screen in the embodiment shown in FIG. 1, it is possible for the viewpoint assessment or object tracking to be implemented using a single sensor. For example, the sensors 140a and 140b could be replaced by a single sensor 140 that has a wider coverage range so that it essentially covers the same range as sensors 140a and 140b combined. Since the coverage of the sensors is determined by the capture range (both distance and angular coverage) of the sensor or the combination of sensors, the sensor or combination of sensors should cover the anticipated position of the user (in the case of the viewpoint assessment sensors for the embodiment in FIG. 1) or the anticipated position of the tracked object (in the case of the object tracking sensor for the embodiment shown in FIG. 1).

Although the term "user" is used throughout, when used with respect to the viewpoint assessment sensors, the term user refers to the features of the user (eyes, head and shoulders, face, etc.) necessary for the viewpoint assessment component, to determine the user viewpoint. With reference to the object tracking device, the object being tracked is a physical object capable of being manipulated by a user. The tracked object being manipulated by the user behind the display screen, can be the user's own hand or alternatively, another physical object (e.g. block, pliers, etc.) that the user is directly or indirectly manipulating. For example, a user could be directly manipulating a physical object (the block shown in FIGS. 5A and 5B) or indirectly manipulating a physical object (for example (not shown), using his hand to hold pliers which he uses to manipulate the block).

The display screen can be the size of a large desktop monitor, as shown in the FIG. 1, or the display screen can be smaller—such as a notebook computer display screen or mobile device screen. In the case of a mobile or handheld device, the user would typically hold the device with one hand and look at objects or scenes behind the mobile device by looking through the mobile device screen.

Figure 3:
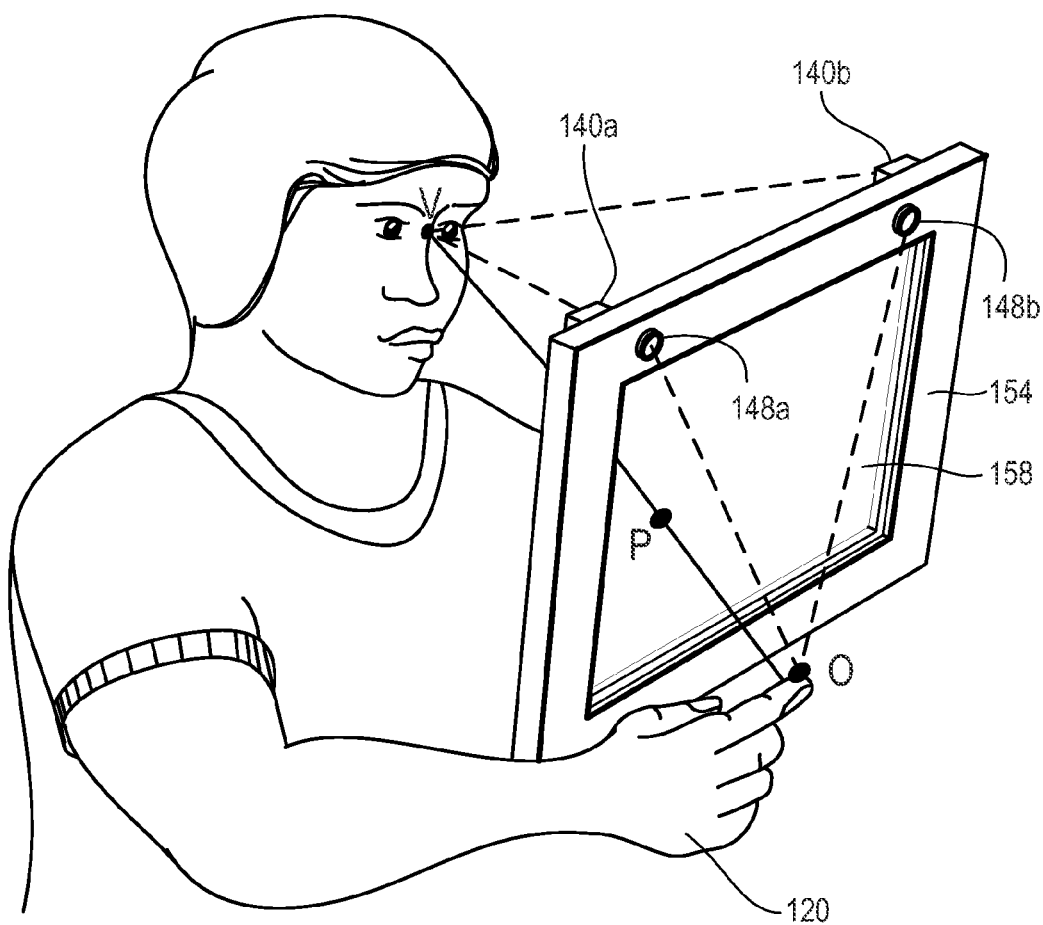
FIG. 3 shows a view of the points required to generate the user's viewpoint according to one embodiment of the invention.

Referring to FIG. 3 shows a view of the points used in one implementation to generate a viewpoint from the perspective of a user. As shown in FIG. 3, the location of the user's viewpoint in front of the display screen 112 is designated by the symbol (V), the location of the object located behind the screen is designated with the symbol (O). The location of the content on the display screen 112 is designated by the symbol (P). According to one embodiment of the invention, content is generated based on the user's viewpoint and the location of the tracked object.

Figure 4A:
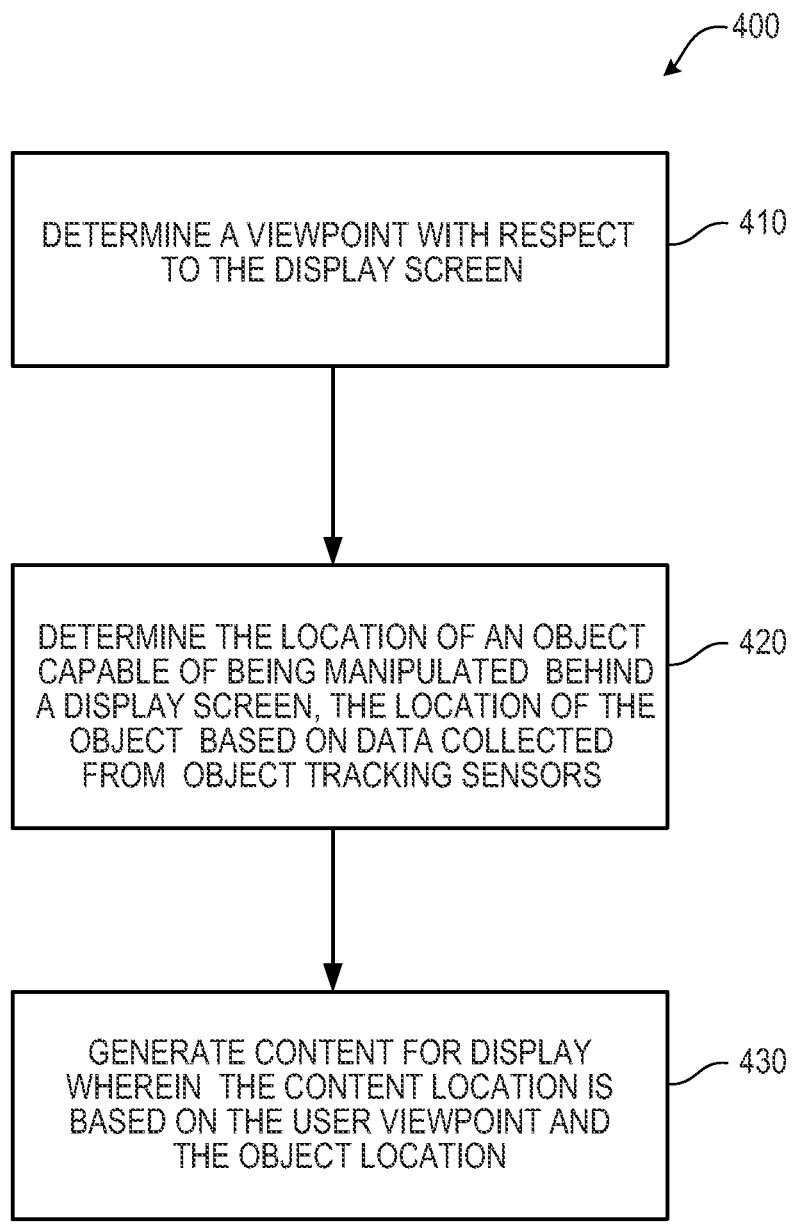
FIG. 4A shows a flow diagram for a method of displaying an image for augmenting an object behind a transparent display screen according to an embodiment of the invention.

FIG. 4A shows a flow diagram for a method 400 of displaying an image for augmenting an object behind a transparent display screen according to an embodiment of the invention. The method shown in FIG. 4A includes the steps of: determining a user viewpoint based on data collected by the viewpoint assessment sensors (step 410); determining the location (and, optionally, shape and orientation) of an object capable of being manipulated by a user behind a display screen, wherein the object location is based on data collected from at least one object tracking sensor (step 420); and generating content for display on a display screen, wherein the generated content location is based on the viewpoint with respect to the location of the object positioned behind the display screen (step 430).

Although different definitions of user viewpoint can be used, with respect to FIG. 1 the location of the user viewpoint is described (for purposes of discussion only) as the position (V) located midway between the user's two eyes. Eye position or location can be found using various techniques including through the user of face detection software or by approximation from the position of a tracking device being worn by the user.

In one embodiment, determining the user's eye position is found using IR (infrared) illumination. In this implementation, an IR illumination source floods IR light in the vicinity of the user. In this case, the viewpoint assessment sensors 140a, 140b are IR sensitive devices, typically an IR sensitive camera. IR light is reflected off the user's retina and the IR sensitive camera (the viewpoint assessment sensor) captures the user's eye location relative to the display screen and the object positioned behind the display screen. Based on the location of the user's eyes, the viewpoint assessment component determines the user's viewpoint with respect to the screen and the object.

In an alternative embodiment, information about the user's eye position (used to determine the user's viewpoint) can be achieved using face detection software 180. In this case, the viewpoint assessment sensors 140a, 140b can be simple cameras. Based on the feature detection software 180 in the viewpoint assessment component 116, the eye position of the user is located. Based on the eye position of the user, the user viewpoint can be determined.

In an alternative embodiment, some form of active tracking of the user's position is used. For example, the user could wear a device that is capable of being tracked in 3D space. In one implementation, retro-reflective markers could be applied to an object worn by the user (i.e. a headset, a pair of glasses, etc.). Based on the position of the tracked object, the viewpoint assessment component software 116 provides an accurate approximation of the user's eye location.

In another alternative embodiment, the eye location of the user can be approximated using depth cameras as the viewpoint assessment sensor 140a, 140b. In this implementation, a depth camera is used to locate the user (user's head and shoulder at a depth or depth range nearer to the depth camera) and the background (at a depth or depth range further from the camera). The viewpoint location can then be approximated as being at the center of the head shaped region in the depth image. Any of the above techniques listed in the preceding paragraphs can be combined to give a more accurate determination of the viewpoint location.

In one embodiment, the display is an auto-stereo display. In these displays, after determining the location of each eye, different views are provided for each eye. The display system thus needs to know the location of each eye, so that content can be generated in the right location for each eye. Some of the embodiments described above give the position for each eye directly, in those that don't the typical human inter-occular distance can be used to calculate eye positions from a single viewpoint.

Referring to FIG. 2C shows a block diagram of a back perspective view of a display screen in an augmented reality display system according to an embodiment of the invention. In the embodiment shown in FIG. 2C, the object tracking sensors tracks the physical objects (e.g., user's hand 120a, and physical cube 120b) physically positioned behind the display screen. In the implementation shown in FIG. 2C, object tracking sensors 148a, 148b are shown located or embedded in the frame 154 located around the periphery of the display screen, collect information about an object positioned behind the back surface 158 of the display screen 112.

Although the object being manipulated by the user can be a physical or virtual object (an augmented image) being displayed on the display screen, the object being tracked behind the display screen by the object tracking sensors is a physical object. Further, a single or multiple objects may be tracked. For example, in the case of a user manipulating a virtual image as shown in FIGS. 6A and 6B, the physical object 120a located behind the display screen and being tracked is the user's hand. In the example shown in FIGS. 5A and 5B where the user is manipulating a rectangular block behind the screen, there are two physical objects behind the display screen being tracked—the user's hand 120a and the rectangular block 120b. The user can manipulate the block so that the displayed object (the car) appears to be inside of the block.

Although many types of object tracking sensors 148a, 148b can be used, in one embodiment the object tracking sensors are image capture devices. In one implementation, the image capture device (object tracking sensor) is a depth camera. For applications that require sensing gestures and objects in the volume of space behind the screen, a depth camera would be appropriate as it provides information regarding the shape and location of the object in 3D. For example, for the case where the tracked object is the user's hand, the depth camera would provide information regarding where the user's fingers are and the position of the user's fingers in relationship to the second tracked object (the rectangular cube.)

Although depth cameras may be used to provide information about the shape and location of the object in 3D space, other types of sensors and techniques for determining position and shape of the tracked object could be used. For example, sensors and techniques that are used for sensing gestures and object in front of the display screen, might also be applied for tracking objects behind the display screen.

In one embodiment, the objects to be tracked have a code embedded on the object or registration marks on the object and the object tracking sensor is a camera. For example, a barcode label could be attached to the tracked object 120. In this case, the camera capturing an image of the code or registration marks and based on the location of those marks, could also determine where the object is physically located. Further, software can interpret the code or markings to provide information about the object (i.e. size, shape, use instructions, etc.).

The display controller component 130 includes: a viewpoint assessment component 116, an object tracking component 124 and a display generation component 126. The display generation component 126 creates an overlaid image that is displayed on the transparent screen that provides a natural way to augment user interactions with real world objects (located behind the display screen). Because the display screen 112 is transparent, the user can easily view and interact with both the physical object 120 located behind the screen and the overlaid image 510 displayed on the transparent display.

The display system creates an "overlaid" image 510 on the display screen 112—where the overlaid image 510 is an image generated on the display screen that is between the user's viewpoint and the object 120 behind the screen that it is "overlaid" on. The overlaid image is dependent upon the user's viewpoint. Thus, the position of the overlaid image with respect to the object behind the display screen stays consistent even as the user moves their head and/or the object behind the display screen.

For the embodiments shown in FIGS. 1-3 and 5-6, what content or image 510 is displayed on the display screen is at least in part dependent upon a user viewpoint. Based on the user viewpoint, the display system 100 determines where and what parts of the object located behind the screen appear on the display. When rendering based on a different user viewpoint, different parts/different views of the object are displayed. If the user changes his position (angle from the display screen, distance from the display screen, etc.) then his viewpoint (V) from the screen changes. If the content displayed on the screen is being rendered from a different viewpoint, the overlaid image 510 appears at a different point on the screen.

Step 430 shown in FIG. 4A is the step of generating content for display on a display screen wherein the location of the content is based on the user viewpoint location and the behind screen object location. Step 430 is shown in expanded detail in FIG. 4B. Referring to 4B, step 430 (the step of generating content for display) further includes the steps of determining the augmented image to be displayed (step 440); determining the line of sight between the user viewpoint location and the behind screen object location (step 450); and for each pixel of the augmented image determining along the line of sight, the pixel location of the augmented image on the plane of the display screen (step 460).

Referring again to FIG. 3 shows a view of the points required to generate content on the display screen. In one embodiment, the location designated by the symbol P is found by determining the line of sight (the line) between two points—where the two points are (1), the point "0", the location of the object behind the screen and (2), the point "V", the user's viewpoint. The display system can then determine the pixel locations (P) on the display screen that correspond to the user's line of sight between the two points. This allows the generated content on the display screen to be registered to real objects behind the screen. Further, the display system recognizes the position of the user's hands (in this case the object) with respect to the projected elements (content displayed on the display screen) in the scene.

Figure 5A:
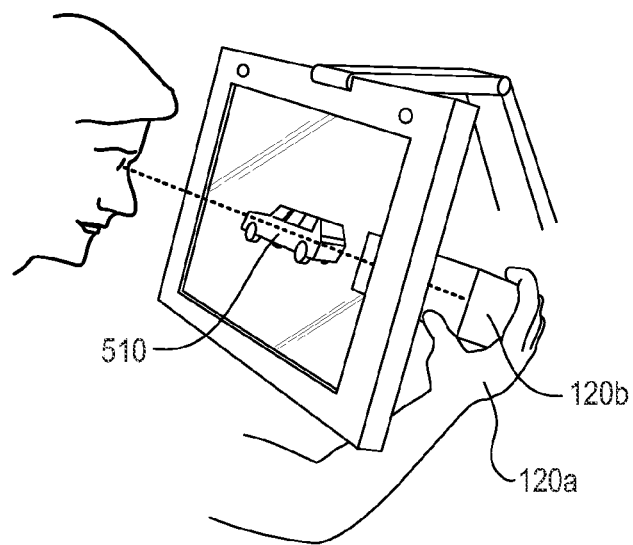
FIG. 5A shows a side perspective view of a desktop version of an augmented display system where the user is manipulating a physical object behind the display screen according to one embodiment of the invention.
Figure 6A:
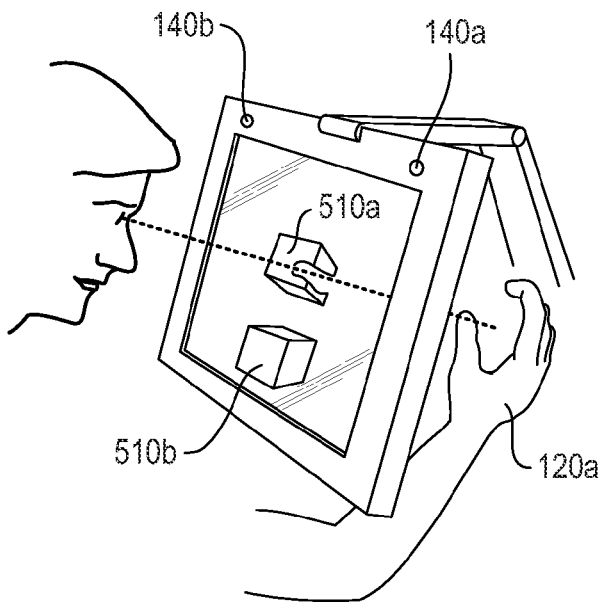
FIG. 6A shows a side perspective view of a desktop version of an augmented display system where the user is manipulating a virtual object behind the display screen according to one embodiment of the invention.
Figure 6B:
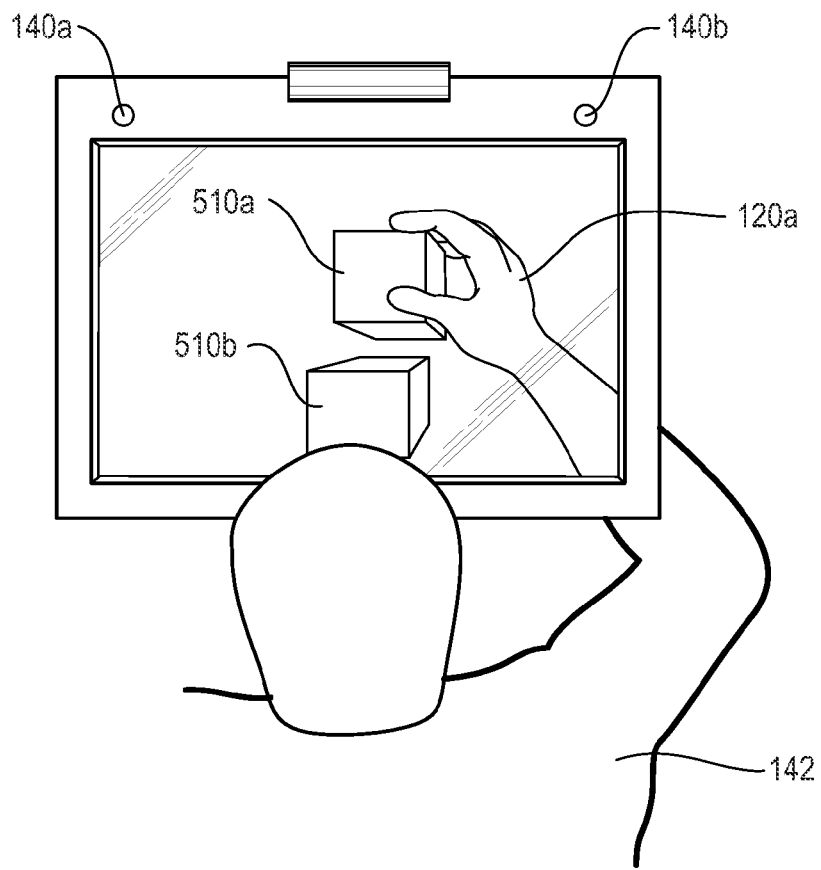
FIG. 6B shows a front perspective view of the augmented display system shown in FIG. 6A where the user is manipulating a virtual object behind the display screen according to one embodiment of the invention.

FIG. 5A shows a side perspective view of a desktop version of an augmented display system where the user is manipulating a physical object behind the display screen according to one embodiment of the invention. In the embodiment shown in FIG. 5A, there are two physical objects located behind the display screen. The first physical object is the user's hand 120a. The second physical object is a rectangular block 120b being held or manipulated by the user's hand 120a. In the embodiment shown in FIG. 5A, the overlaid image 510 is an image of a car.

Figure 5B:
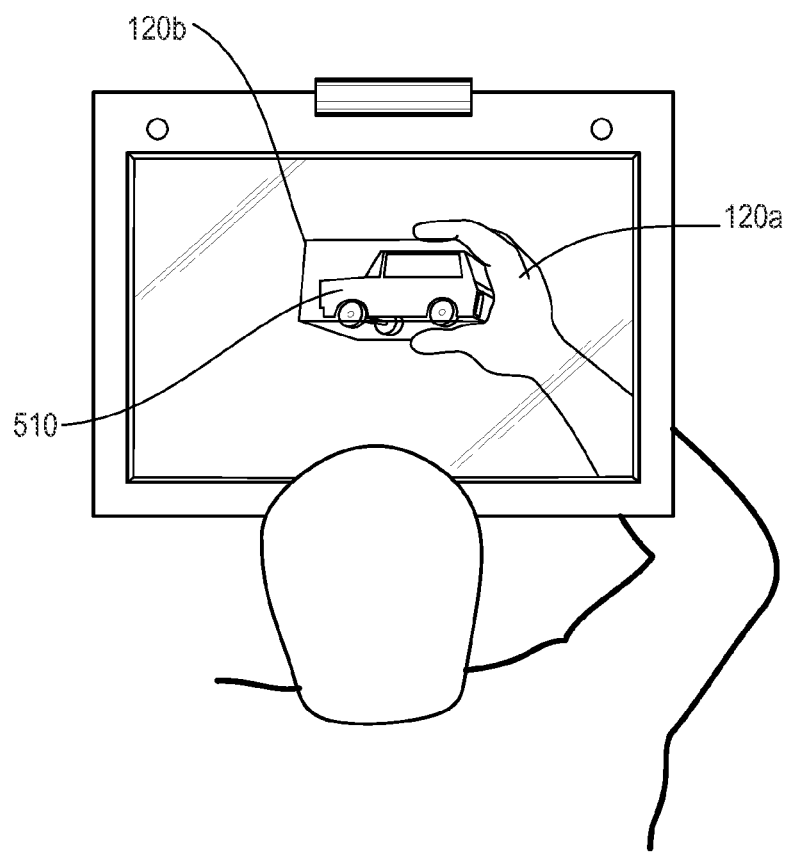
FIG. 5B shows a front perspective view of the display system shown in FIG. 5A where the user is manipulating a physical object behind the display screen according to one embodiment of the invention.

FIG. 5B shows a front perspective view of the same configuration shown in FIG. 5A, where the view on and through the screen is intended to represent the view presented to the user. As can be clearly seen from FIG. 5A, the overlaid image of the car 510 appears on the display screen 112—but is not part of the physical object 120a, 120b behind the screen. However, when the user is viewing the object from the front of the transparent display screen (the front perspective shown in FIG. 5B), it appears to the user that the car 510 is overlaid within the rectangular block 120b (the physical object.) Thus, the display system simulates an object (a block) where content (a car) is overlaid onto the physical object behind the display screen. As the user changes his viewpoint with respect to the object (the rectangular block 120b), the overlaid object (the car 510) on the display screen 112 moves to follow the physical object position.

In the embodiment shown in FIGS. 5A and 5B, the user is shown manipulating physical objects (his hand 120a, a rectangular open cube 120b). In an alternative embodiment shown in FIG. 6A, the display system is used to provide a means for the user to view, interact with and manipulate virtual objects. The virtual objects are shown as images on the display screen (referred to as an overlaid image or augmented image).

Referring to FIG. 6A shows a side perspective view of a desktop version of the display system with two virtual objects overlaid on the display screen. In the embodiment shown, the physical object tracked behind the display screen is the user's hand. In the embodiment shown in FIG. 6A, the user is manipulating at least one virtual object—the uppermost cube 610a.

Referring to FIG. 6B shows a front perspective view of the augmented display system shown in FIG. 6A, where the view on and through the screen is intended to represent the view presented to the user. In the embodiment shown in FIG. 6A, the user's hand is shown manipulating a cube (a virtual object 510a). Although the virtual object is actually an overlaid image that is located on the surface of the display screen 112, in one embodiment the object 510a is simulated to appear in 3D behind the display screen. In one example, the impression of depth (appearance of object behind the display screen) is created simply by using the motion parallax that occurs naturally as part of the display generation component 126. For instance, if the virtual object 510a is rendered so as to appear to be behind the user's hand, then—as the user moves their head from side to side—that object will appear to move less with respect to the screen than the user's hand. By tracking the user's head position, the display screen can convey an impression of depth in a scene using motion parallax.

The embodiment shown in FIGS. 6A and 6B, show a user manipulating a virtual object (a cube) behind the display screen. As shown, portions of the user's hand manipulating the virtual object are occluded by the virtual object. In order to implement occlusions with respect to the overlaid image shown on the screen, the display system needs detailed 3D information about the physical object positioned behind the screen. Based on the information about the 2D overlaid image (the virtual object or cube) displayed on the screen and the detailed 3D information about the object behind the screen, the occlusion component 186 of the display generation component 126 determines what parts of the overlaid image should be blocked by or occluded on the display screen and what parts of the overlaid image should be displayed.

In one embodiment, the detailed 3D information about the object behind the screen (the user's hand) is provided by depth cameras. In other words, in this example the object tracking sensors 148a, 148b would be depth cameras. Since the sensors described above can provide three-dimensional information on the position and shape of the user's hand, the display system 100 can determine what parts of the computer generated content the user's hand should occlude and not display those parts on the overlaid image of the cube 610a. Thus, simulating occlusion from the point of view of the user.

Also provided to the display system 100 is a description of the overlaid image 184 that is shown on the display screen. In one embodiment, the description of the overlaid image 184 is a 2D description of the object available for user interaction or manipulation. In one embodiment, the description of the overlaid image 184 is a 3D description of the object available for user interaction or manipulation. In one example, the description of the overlaid image is provided by the display system and another example, the description of the overlaid image is provided by the user.

In one example, graphic rendering software 190 capable of rendering a 3D overlaid object on a 2D screen is included in the display generation component. Thus a 2D description of the overlaid image can be converted into a 3D overlaid object on a 2D display screen. Assume an example where the display system has a 3D description of the physical object behind the screen and a 3D description of the 2D overlaid image displayed on the display screen. Using the 3D information provided for the overlaid image, the display system can simulate/determine how the overlaid virtual image interacts with a physical object positioned behind the screen. From this simulation, determinations can be made about which areas of the virtual image and which areas of the physical objects are shown and which areas are occluded, as well as how the user's movements result in interacting with the virtual content (e.g. has the user grasped a virtual object, allowing them to move it).

As previously stated with respect to the image shown in FIGS. 6A and 6B, part of the virtual cube on the display that the user is manipulating is occluded by the user's fingers. For the transparent screen implementation described, the 3D information provided allows the display system to determine which parts of the overlaid image are erased (would not be shown if you were manipulating the object in 3D space.) Objects that are not shown are transparent on the transparent display screen.

Figure 7A:
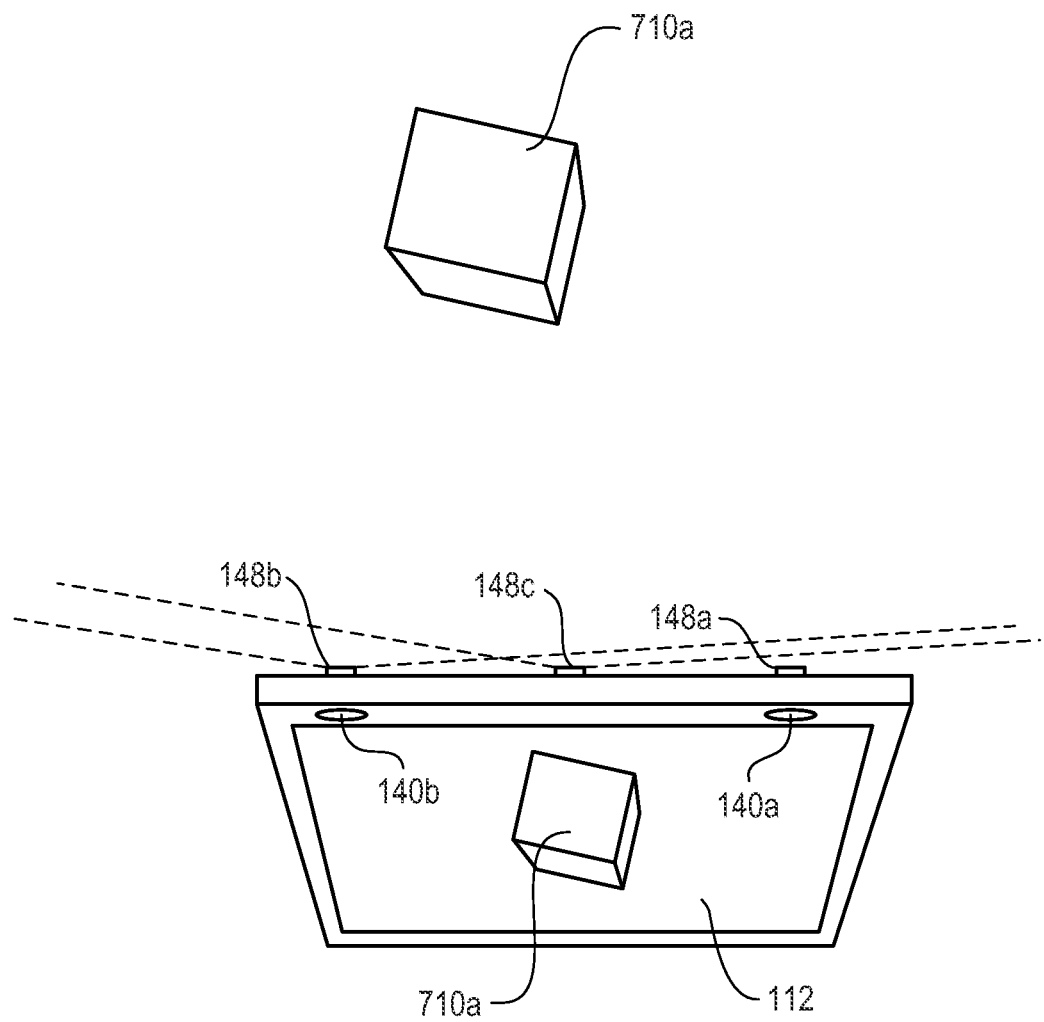
FIG. 7A shows a perspective front view of a handheld version of an augmented reality display system according to an embodiment of the invention.

FIG. 7A shows a perspective front view of a handheld version of an augmented reality display system according to an embodiment of the invention. The display screen of the embodiment shown in FIG. 7A may or may not be transparent. In one embodiment, instead of being a transparent screen, the display screen 112 is a conventional opaque screen.

In this opaque screen implementation, the display screen attempts to simulate a transparent screen by capturing the view of the physical object 710a located behind the screen and displaying this content on the display screen 112. This captured image provides an approximation of the actual view that would be shown by a transparent screen, but with an offset viewpoint. Instead of being the captured image reflecting the user's view through the transparent screen, the viewpoint seen on the display screen is from the perspective of a camera 148c positioned on the back of the display screen.

In the embodiment shown in FIG. 7A, the at least one object tracking sensor is a video camera positioned to capture the scene behind the display screen. The display system simulates a transparent screen by outputting on the display screen of the handheld device—the image of the object behind the display screen captured by the object tracking sensor 148c in real time. In the example shown in FIG. 7A, the image displayed on the display screen is identical to a portion of the image captured by the object tracking sensor 148c.

For the opaque screen embodiment, at least one object tracking sensor is a video camera. In one embodiment (not shown), a single object tracking sensor is used. In this embodiment, the object tracking sensor is a depth video camera or other image capture device capable of (1) providing information about the object location (O) and (2) providing a video image of the area or scene behind the display screen. In another embodiment (shown in FIG. 7A), the object tracking sensors 148a and 148b are used to track the object location behind the display screen and the object tracking sensor 148c is used to provide video of the scene behind the display screen.

In one embodiment, the image output to the display (the image transmitted to simulate the transparent screen) is modified. For example, if the sensor information about the user position in front of the display screen is available, the system could try to modify the image to more closely approximate the viewpoint of the user—instead of the viewpoint of the object tracking sensor 148c.

Figure 7B:
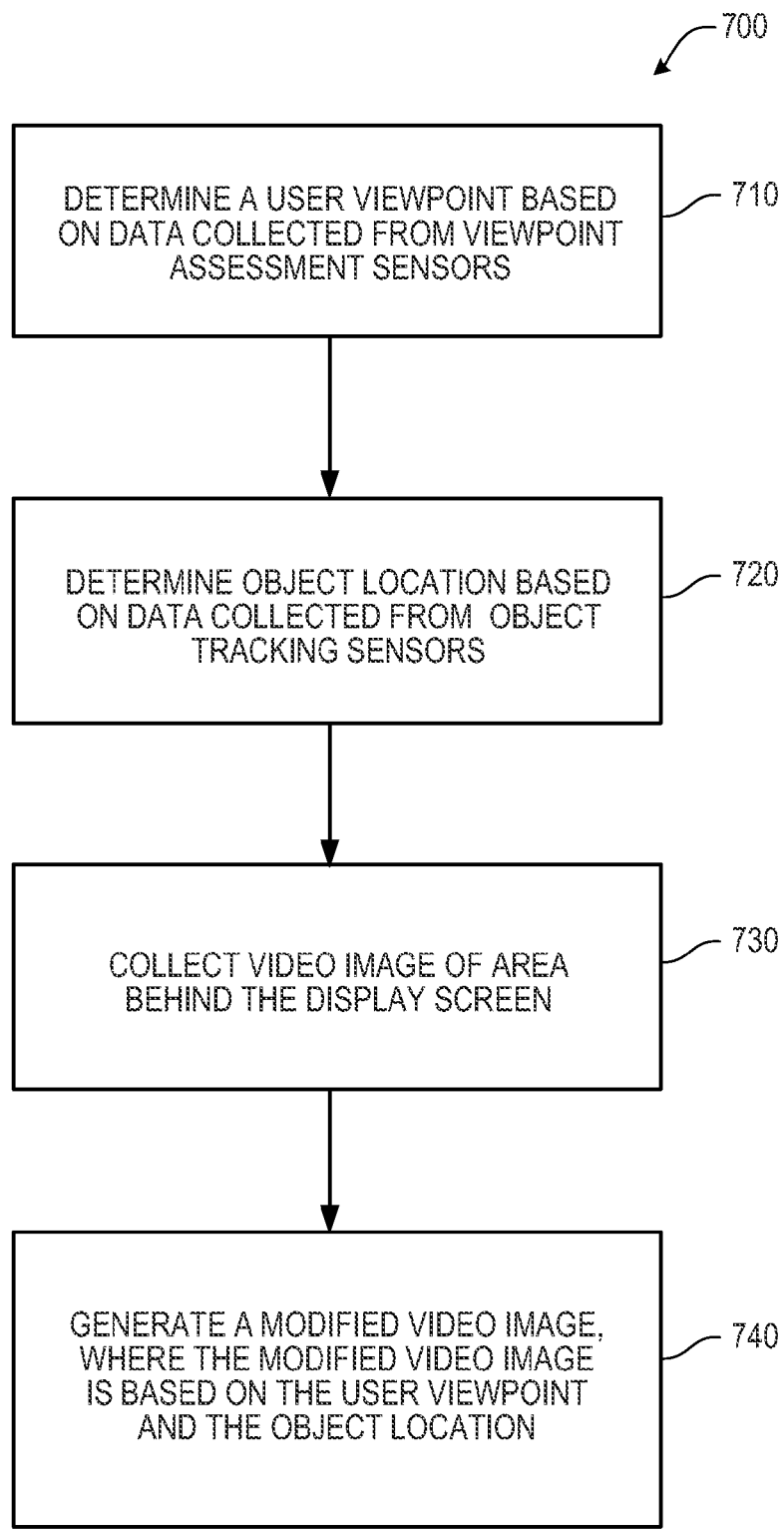
FIG. 7B shows a flow diagram for a method of generating content for display on the opaque display screen shown in FIG. 7A according to an embodiment of the invention.

FIG. 7B shows a flow diagram for a method 700 of generating content for display on the opaque display screen shown in FIG. 7A according to an embodiment of the invention. The method shown in FIG. 7B includes the steps of: determining a user viewpoint based on data collected by the viewpoint assessment sensors (step 710); determining the location (and optionally, shape and orientation) of an object based on data collected from an object tracking sensor (step 720); collecting video image data of the scene behind the display screen (step 730); and generating a modified video image, where the modified video image is modified based at least on the user viewpoint and the object location (step 740).

Steps 710 and 720 are similar to the steps 410 and 420 in the method 400. However, in the implementation described with respect to FIG. 7A, an additional step of collecting a video image is required. Although a video image may be collected in the method 400, it is not required to generate content. In the implementation of FIG. 7A since the screen is not transparent, the video image is used to simulate what would appear to a user through a transparent screen. The video image is modified so that only the part of the view (from the video image) that the user would normally see through the transparent screen is displayed. The video image is modified based on the user viewpoint and object location. Typically this is accomplished by modifying the video to take into account the viewpoint of the user, the extent of the scene that is occluded by and therefore needs to be displayed on the screen, and the location of the object behind the screen.

Figure 8:
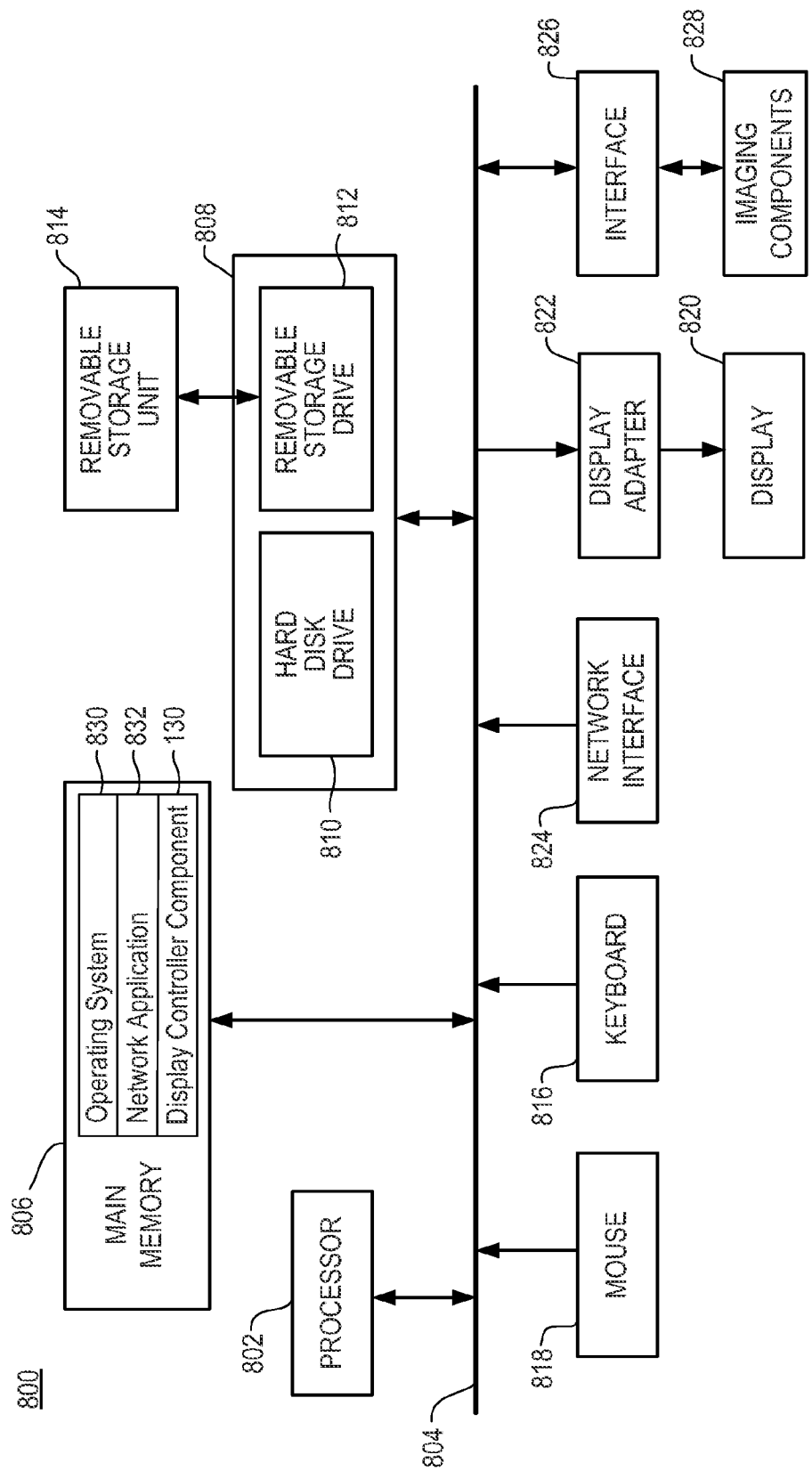
FIG. 8 shows a computer system for implementing the methods shown in FIG. 4A-4B and 7B and described in accordance with embodiments of the present invention.

FIG. 8 shows a computer system for implementing the methods shown in FIG. 4 and described in accordance with embodiments of the present invention. It should be apparent to those of ordinary skill in the art that the method 400 represents generalized illustrations and that other steps may be added or existing steps may be removed, modified or rearranged without departing from the scopes of the method 400. The descriptions of the method 400 are made with reference to the system 100 illustrated in FIG. 1 and the system 800 illustrated in FIG. 8 and thus refers to the elements cited therein. It should, however, be understood that the method 400 is not limited to the elements set forth in the system 800. Instead, it should be understood that the method 400 may be practiced by a system having a different configuration than that set forth in the system 800.

Some or all of the operations set forth in the method 400 may be contained as utilities, programs or subprograms, in any desired computer accessible medium. In addition, the method 400 may be embodied by computer programs, which may exist in a variety of forms both active and inactive. For example, they may exist as software program(s) comprised of program instructions in source code, object code, executable code or other formats. Any of the above may be embodied on a computer readable medium, which include storage devices and signals, in compressed or uncompressed form.

Figure 4B:
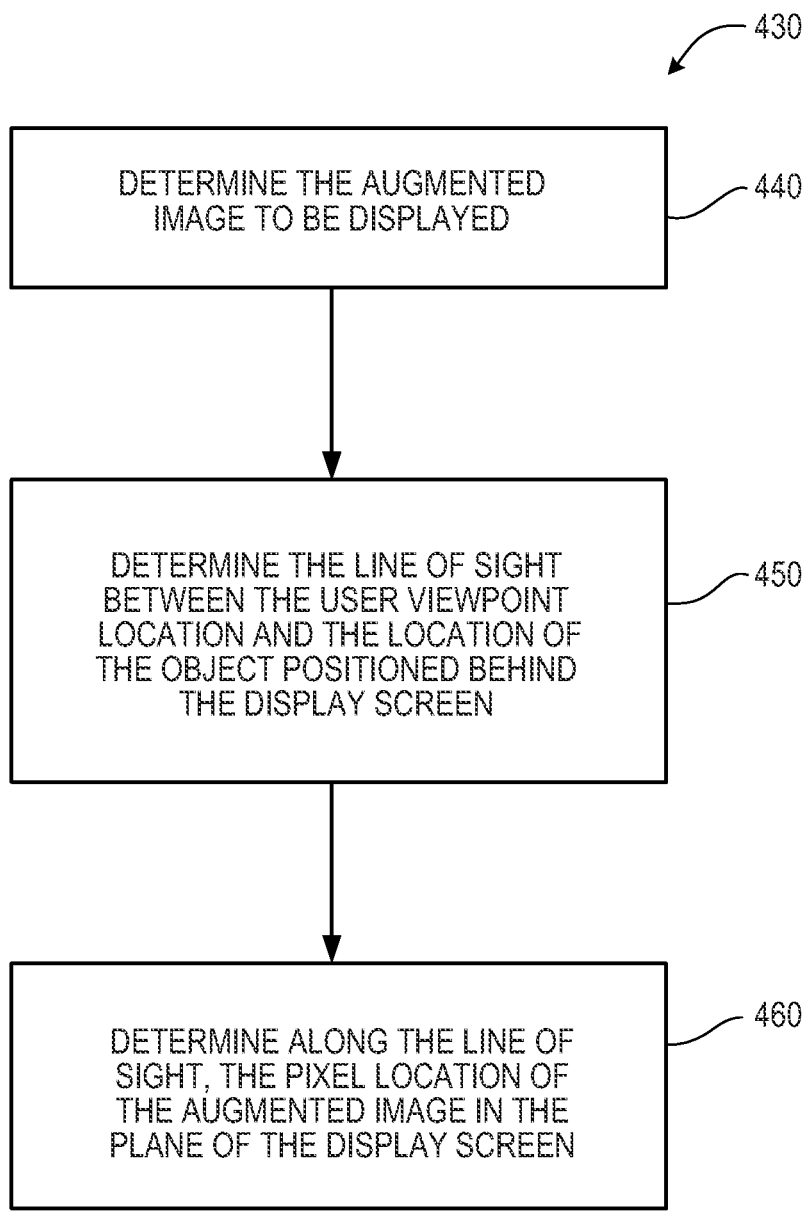
FIG. 4B shows a flow diagram for a method of generating content for display on a display screen according to an embodiment of the invention.

FIG. 8 illustrates a block diagram of a computing apparatus 800 configured to implement or execute the methods 400 depicted in FIGS. 4A, 4B and 7B, according to an example. In this respect, the computing apparatus 800 may be used as a platform for executing one or more of the functions described hereinabove with respect to the display controller component 130.

The computing apparatus 800 includes one or more processor(s) 802 that may implement or execute some or all of the steps described in the methods 400. Commands and data from the processor 802 are communicated over a communication bus 804. The computing apparatus 800 also includes a main memory 806, such as a random access memory (RAM), where the program code for the processor 802, may be executed during runtime, and a secondary memory 808. The secondary memory 808 includes, for example, one or more hard drives 810 and/or a removable storage drive 812, representing a removable flash memory card, etc., where a copy of the program code for the method 800 may be stored. The removable storage drive 812 reads from and/or writes to a removable storage unit 814 in a well-known manner.

Exemplary computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

Although shown stored on main memory 806, any of the memory components described 806, 808, 814 may also store an operating system 830, such as Mac OS, MS Windows, Unix, or Linux; network applications 832; and a display controller component 130. The operating system 830 may be multiparticipant, multiprocessing, multitasking, multithreading, real-time and the like. The operating system 830 may also perform basic tasks such as recognizing input from input devices, such as a keyboard or a keypad; sending output to the display 820; controlling peripheral devices, such as disk drives, printers, image capture device; and managing traffic on the one or more buses 804. The network applications 832 includes various components for establishing and maintaining network connections, such as software for implementing communication protocols including TCP/IP, HTTP, Ethernet, USB, and FireWire.

The computing apparatus 800 may also include an input devices 816, such as a keyboard, a keypad, functional keys, etc., a pointing device, such as a tracking ball, cursors, etc., and a display(s) 820, such as the screen display 110 shown for Example in FIGS. 1-3 and 4-7. A display adaptor 822 may interface with the communication bus 804 and the display 820 and may receive display data from the processor 802 and convert the display data into display commands for the display 820.

The processor(s) 802 may communicate over a network, for instance, a cellular network, the Internet, LAN, etc., through one or more network interfaces 824 such as a Local Area Network LAN, a wireless 802.11x LAN, a 3G mobile WAN or a WiMax WAN. In addition, an interface 826 may be used to receive an image or sequence of images from imaging components 828, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A display system comprising:
a display including a display screen;
a viewpoint assessment component to determine a viewpoint of a user positioned in front of the display screen; and
an object tracking component to track the user physically manipulating an object that is a physical object other than the user positioned behind the display screen.

2. The display system recited in claim 1 further including a display generation component, wherein based on data from the viewpoint assessment component and the object tracking component, the display generation component creates content for display on the display screen, the content comprising an augmented version of the object.

3. The display system recited in claim 2 wherein the display screen is capable of operating in a transparent mode.

4. The display system recited in claim 3, wherein the object tracking component is capable of receiving data from at least one object tracking sensor, the at least one object tracking positioned to capture an object behind the display screen.

5. The display system recited in claim 4, further wherein the object located behind the screen is registered with an augmented image on the display screen.

6. The display system recited in claim 2, wherein the viewpoint assessment component is capable of receiving data from at least one viewpoint assessment sensor, the at least one viewpoint assessment sensor facing outwards from the front of the display screen to capture a user positioned in front of the display screen.

7. The display system recited in claim 6, wherein the captured data from the at least one viewpoint assessment sensor is used to determine the user's eye position.

8. The display system recited in claim 7 wherein based on user eye position, the viewpoint of the user is determined.

9. The display system recited in claim 8 wherein based on the user viewpoint and object location, the line of sight is of the user is determined, wherein based on the line of sight the augmented image is displayed in the plane of the display screen.

10. The display system recited in claim 3 wherein the display screen is capable of operating in an opaque mode.

11. The display system recited in claim 10 wherein at least one of the object tracking sensors is a video camera and wherein the output of the video camera is output as content onto the display screen.

12. A computer readable storage medium having computer readable program instructions stored thereon for causing a computer system to perform instructions, the instructions comprising the steps of:
- to determine a user viewpoint based on data collected from viewpoint assessment sensors;
- to determine an object location of an object that is a physical object separate from the user and that the user is manipulating behind a display screen, the location of the object determined based on data collected from object tracking sensors; and
- to generate content for display that includes an augmented version of the object, wherein the content location is determined based upon user viewpoint and object location.

13. The computer readable storage medium recited in claim 12, wherein the content location is determined by determining the line of sight between the user viewpoint and the location of the object positioned behind the display screen.

14. The computer readable storage medium recited in claim 12, wherein for each pixel of an augmented image to be displayed, the pixel location of the augmented image is located along the line of sight in the plane of the display screen.

15. A computer readable storage medium having computer readable program instructions stored thereon for causing a computer system to perform instructions, the instructions comprising:
- to determine a user viewpoint based on data collected from viewpoint assessment sensors;
- to determine object location of an object that is a physical object, separate from the user and that is being manipulated by the user, based on data collected from object tracking sensors;
- to collect a video image of the area behind the display screen; and
- to generate a modified video image, where the modified video image is based on the user viewpoint and object location and includes an augmented version of the object.

16. The computer readable storage medium recited in claim 15, wherein the modified video image is output on the display screen.

17. The display system of claim 1, wherein the display is opaque and prevents the user from seeing the object behind the display screen.

* * * * *